United States Patent Office 3,063,948
Patented Nov. 13, 1962

3,063,948
COPOLYMERS OF VICINAL-EPOXY HYDROCARBONS WITH N-2,3-EPOXY CARBAZOLES
Frederick E. Bailey, Jr., Charleston, and Haywood G. France, South Charleston, W. Va., assignors to Union Carbide Corporation, a corporation of New York
No Drawing. Filed June 2, 1959, Ser. No. 817,457
4 Claims. (Cl. 260—2)

This invention relates to a process for polymerizing epoxide compounds and to the products resulting therefrom.

In its broad aspect this invention is directed to the process for homopolymerizing N-(2,3-epoxypropyl)carbazole, or copolymerizing N-(2,3-epoxypropyl)carbazole with a vicinal-epoxy hydrocarbon which is free of unsaturation other than aromatic unsaturation to produce useful polymers. The terms "N-(2,3-epoxypropyl)carbazole" and "vicinal-epoxy hydrocarbon free of unsaturation other than aromatic unsaturation" as well as the various catalysts which can be employed to effect the polymerization reaction will be described in detail at a more appropriate section of this specification.

The novel homopolymers and copolymers resulting from the reaction can vary from viscous liquids to high molecular weight solids. The novel copolymers can be water-soluble or water-insoluble depending upon the quantity of ethylene oxide copolymerized therein. For instance, the novel copolymers of this invention comprising less than 50 weight percent of oxyethylene groups are essentially water-insoluble; those copolymers comprising greater than 50 weight percent of oxyethylene groups are water-soluble to a substantial degree, and this water-solubility characteristic becomes more pronounced with copolymers containing proportionately greater amounts of oxyethylene groups therein. Hence, one apparent advantage afforded by the practice of the instant invention is the preparation of novel copolymers whose physical characteristics can be "tailor-made" to fit desired fields of applications and uses especially where the water-solubility characteristic is of paramount importance, e.g., in the preparation of films from aqueous solution, in the coatings field, in the water thickening and lubricating fields, and the like.

Accordingly, one or more of the following objects will be achieved by the practice of this invention.

It is an object of this invention to provide a novel process for homopolymerizing an N-(2,3-epoxypropyl)carbazole to produce useful polymers. It is another object of this invention to provide a novel process for copolymerizing an admixture containing an N-(2,3-epoxypropyl)carbazole and a vicinal-epoxy hydrocarbon free of unsaturation other than aromatic unsaturation to produce useful, novel copolymers. A further object of this invention is to provide novel copolymers, the properties and characteristics of which can be "tailor-made" to fit a wide variety of uses and fields of applications. Other objects will become apparent to those skilled in the art in the light of the instant specification.

The N-(2,3-epoxypropyl)carbazoles contemplated as monomeric reagents in the polymerization reaction can be expressed by the following formula:

(I)
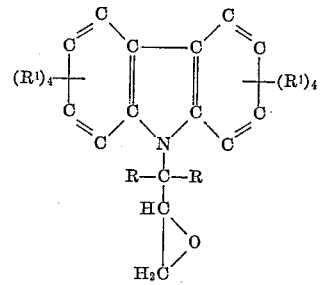

wherein each R or R¹, individually, can be hydrogen or alkyl. Illustrative radicals for each R or R¹ include, for example, methyl, ethyl, propyl, butyl, isobutyl, amyl, n-hexyl, n-octyl, 2,4-dimethyloctyl, dodecyl, and the like. It is preferred that each R or R¹, individually, contains less than 5 carbon atoms. In a highly preferred aspect each R is hydrogen.

Illustrative of the N-(2,3-epoxypropyl)carbazoles which can be employed include, for example, N-(2,3-epoxypropyl)carbazole, N-(2,3-epoxypropyl)-2-methylcarbazole, N-(2,3-epoxypropyl)2,8-dimethylcarbazole, N-(2,3-epoxypropyl)-2-ethyl-5-propylcarbazole, N-(2,3-epoxypropyl)-2-amylcarbazole, N-(1-methyl-2,3-epoxypropyl)-2,7-diethylcarbazole, N-(1-propyl-2,3-epoxypropyl)-3-isobutylcarbazole, N-(1,1-diethyl-2,3-expoxypropyl)-3,6-dipropylcarbazole, N-(2,3-epoxypropyl)-2,3,7-trimethylcarbazole, N-(2,3-epoxypropyl)-2-isooctylcarbazole, N-(2,3-epoxypropyl)2,3-dihexylcarbazole, and the like.

The preparation of the N-(2,3-epoxypropyl)carbazoles is well known in the art. For instance, a carbazole compound which contains the hydrogen atom monovalently bonded to the nitrogen atom of the carbazole nucleus such as carbazole, 2,3-dimethylcarbazole, 2-ethyl-7-propylcarbazole, 3-amylcarbazole, and the like can be reacted with one mol of 1-chloro-2,3-epoxyalkane, e.g., epichlorohydrin, the reaction being carried out in bulk or in a solvent such as an alkanol or an alkanol-water mixture. The N-(2,3-epoxypropyl)carbazole is formed by the subsequent addition of aqueous base to the reaction mixture.

The monomeric vicinal-epoxy hydrocarbon free of unsaturation other than benzenoid unsaturation, i.e., a vicinal-epoxy hydrocarbon which has a single vicinal epoxy group and which is free from unsaturation other than benzenoid unsaturation, employed in the practice of the instant invention can be characterized by the following structural formula:

(II)
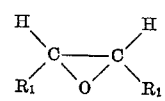

wherein each R₁, individually, can be hydrogen or a hydrocarbon radical free of unsaturation other than benzenoid unsaturation such as, for example, alkyl, aryl, aralkyl, alkaryl, or cycloalkyl radicals. In addition, both R₁ variables can represent a divalent saturated aliphatic hydrocarbon radical which together with the epoxy carbon atoms, i.e., the carbon atoms of the epoxy group,

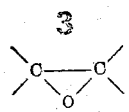

form a saturated cycloaliphatic hydrocarbon nucleus which contains from 4 to 10 carbon atoms, preferably from 4 to 8 carbon atoms, such as, for example, a saturated aliphatic hydrocarbon nucleus derived from cycloalkane, alkyl-substituted cycloalkane, cyclobutane, cyclopentane, cyclohexane, cycloheptane, cyclooctane, 3-methylcyclopentane, 3-amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, benzyl, tolyl, phenethyl phenylpropyl, cyclopentyl, cyclohexyl, 2-methylcyclohexyl, cycloheptyl, 2-butylpentyl, and the like.

Representative vicinal-epoxy hydrocarbon monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 5-benzyl-2,3-epoxyheptane, 4-cyclohexyl-2,3-epoxypentane, styrene oxide, ortho-, meta-, and para-ethylstyrene oxide, benzylethylene oxide, chlorostyrene oxide, the oxabicycloalkanes, e.g., 7-oxabicyclo-[4.1.0]heptane, 6-oxabicyclo-[3.1.0]hexane, 4 - propyl - 7 - oxabicyclo[4.1.0]heptane, 3-amyl-6-oxabicyclo[3.1.0]hexane; alkyl-substituted oxabicycloalkanes; and the like. In a preferred aspect, the vicinal-epoxy hydrocarbon is a lower olefin oxide, e.g., ethylene oxide, propylene oxide, the epoxybutanes, the epoxypentanes, and the like.

Among the classes of catalysts which can be employed to effect the polymerization reaction are certain divalent metal amide-alcoholates characterized by the following formula:

(III)    $H_2N—M—OR$ wherein M is a divalent metal which has an atomic number greater than 4 and less than 57 from group II of the periodic table, i.e., magnesium, calcium, zinc, strontium, cadium, and barium; and wherein R is a monovalent organic radical, preferably a monovalent hydrocarbon radical, e.g., alkyl, cycloalkyl, aryl, alkaryl aralkyl, and the like. Representative R radicals include, among others, methyl, ethyl, propyl, isopropyl, butyl, isobutyl, t-butyl, 2-ethylhexyl, 2,4,4,-trimethylpentyl, decyl, dodecyl, cyclopentyl, cyclohexyl, 2-methylcyclopentyl, 3-amycyclohexyl, phenyl, benzyl, tolyl, ethylphenyl, hexylphenyl, octylphenyl, phenethyl, phenylpropyl, phenylbutyl, and the like. In a preferred aspect the R variable is an alkyl radical which contains from 1 to 10 carbon atoms. It is further preferred that the divalent metal (M) be an alkaline earth metal, i.e., calcium, strontium, or barium. Of the alkaline earth metals calcium is highly preferred.

The divalent metal amide-alcoholate catalysts of this invention can be prepared by various routes. Explanation of the catalyst preparation will be facilitated by illustrating the various chemical equations involved. In these equations the metal will be exemplified by calcium, and the organic reactant will be designated as a specific compound be it an alcohol, an epoxide, or an aldehyde. It is to be understood, however, that other divalent metals can be employed instead of calcium, and other organic reactants can be used instead of the illustrated organic reactant as will be readily apparent from a consideration of this specification.

In one embodiment the alkaline earth metal amide-alcoholate catalysts can be prepared by the reaction of an epoxide compound, i.e., an epoxide compound which contains a cyclic ground composed of two carbon atoms and one oxygen atom, with solid metal hexammoniate or with an ammonia solution of metal hexammoniate as shown in Equation IV below.

(IV)    $Ca(NH_3)_6 + H_2C—CH_2 \longrightarrow H_2N—Ca—OC_2H_5 + 5NH_3$

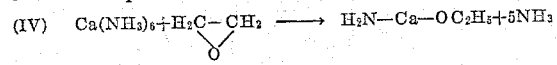

In practice, the above reaction is most conveniently carried out by dissolving the metal in liquid amonia followed by slow addition of the epoxide compound to the resulting agitated solution. The reaction can be conducted at a temperature in the range of from about −70° C., and lower, to about +30° C., and higher. In the event an inert vehicle (described below) is employed, the lower temperature limit is above the melting point of said vehicle. It is understood, of course, that whenever liquid ammonia is employed as a reactant and/or vehicle, the temperature of the liquid ammonia is below about −33.4° C. at atmospheric pressure, or the temperature and pressure are correlated to thus essentially maintain the ammonia in the liquid state. Alternatively, ammonia can be reacted with alkaline earth metal contained in an inert, normally-liquid organic vehicle such as lower dialkyl ether of alkylene glycol, for example, the dimethyl, diethyl or dipropyl ethers of diethylene glycol, and the like; dioxane, saturated aliphatic and cycloaliphatic hydrocarbons, e.g., hexane, heptane, cyclohexane, and the like. When this procedure is followed the alkaline earth metal is added to the inert vehicle while agitating the resulting mixture. Subsequently, ammonia is slowly added to this mixture while maintaining a reaction temperature preferably below about 10° C. to assure formation of the metal hexammoniate. After this, the metal hexammoniate suspension in the inert vehicle can be reacted with the desired epoxide compound to form the metal amide-alcoholate.

With reference to Equation IV supra particularly desirable epoxide reagents are those containing solely oxirane oxygen, carbon, and hydrogen, or solely oxirane oxygen, etheric oxygen, carbon, and hydrogen, said epoxide reagents containing a cyclic group composed of two carbon atoms and one oxygen atom which can be a terminal cyclic group or an internal cyclic group. Illustrative epoxides include, for example, ethylene oxide, propylene oxide, 1,2-epoxybutane, 2,3-epoxybutane, isobutylene oxide, the epoxypentanes, the epoxyhexanes, the epoxyoctanes, the epoxydecanes, styrene oxide, cyclohexylepoxyethane, 1-phenyl-1,2-epoxypropane, 7-oxabicyclo[4.1.0]heptane, 6 - oxabicyclo [3.1.0]hexane, 3-methyl-6-oxabicyclo[3.1.0]hexane; the 2,3-epoxyalkyl alkyl ethers, e.g., 2,3-epoxypropylmethyl ether, 2,3,-epoxypropyl ethyl ether, 2,3-epoxypropyl propyl ether, 2,3-epoxypropyl butyl ether, 2,3 - epoxypropyl 2-ethylhexyl ether, 2,3-epoxybutyl ethyl ether, 2,3-epoxypentyl butyl ether; and the like.

According to Equation IV, one mol of epoxide can react with one mol of metal hexammoniate to give the metal amide-alcoholate. It has been observed, however, that very active catalysts are obtained by reacting less than one mol of epoxide with one mol of metal hexammoniate. In such preparations the unreacted metal hexammoniate in the reaction product ultimately decomposes to the corresponding metal amide. The end result is a mixture of metal amide and metal amide-alcoholate which mixture, as indicated previously, is an exceedingly active catalyst for polymerizing epoxide monomers.

The divalent metal amide-alcoholate catalysts also can be prepared by the reaction of a monohydroxy organic compound with metal amide or metal hexammoniate as illustrated by Equations V and VI below.

(V) $Ca(NH_3)_6 + HOC(CH_3)_3 \rightarrow$
    $H_2N—Ca—OC(CH_3)_3 + H_2 + 5NH_3$ (VI) $Ca(NH_2)_2 + HOC(CH_3)_3 \rightarrow$
    $H_2N—Ca—OC(CH_3)_3 + NH_3$ Equation V is applicable to alkaline earth metal hexammoniates preferably dissolved in liquid ammonia whereas in Equation VI the reagent can be a divalent metal amide wherein the metal portion has an atomic number greater than 4 and less than 57 from group II of the periodic table. The reactions illustrated by Equations V and VI can be conducted at a temperature in the range of from about —70° C., and lower, to about +60° C., and higher. Of course, when an inert, normally-liquid vehicle is employed, the lower temperature limit is above the melting point of said vehicle.

A further preparation of the metal amide-alcoholate catalysts is by the reaction of a saturated aliphatic aldehyde with alkaline earth metal hexammoniate, preferably in a liquid ammonia medium, according to the following equation.

(VII)  $Ca(NH_3)_6 + H_3CCH \longrightarrow H_2N-Ca-OC_2H_5 + 5NH_3$ (with =O above CCH)

The reaction can be conducted at a temperature in the range of from about —70° C., and lower, to about +60° C., and higher. When employing an inert, normally-liquid vehicle, the lower temperature limit is above the melting point of said vehicle.

The "exposure activated" alkaline earth metal alcoholates represent a second class of compounds which effectively catalyze the polymerization reaction. Prior to "exposure activation," the alkaline earth metal alcoholates are represented by the following formula:

(VIII)  RO—M—OR wherein M is an alkaline earth metal, i.e., strontium, calcium, or barium; and wherein each R variable can be considered to be derived from the same or different mono- of polyhydroxy organic compounds such as, for example, alkanols, cycloalkanols, alkylene glycols, or phenols. It is to be understood, of course, that when R is a polyhydroxy organic compound, each M valence also can be separately bonded through two different hydroxyl oxygens of the same R moiety, i.e.,

and thus R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerythritol, cyclopentanol, cyclohexanol, 4-butylcyclohexanol, 3-octylcyclopentanol, cycloheptanol, and the like; from mono- and polyalkylene glycol, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2-(β-methoxyethoxy)ethanol, 2-(β-butoxyethoxy)ethanol, 3 - (β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenol, the naphthols, the naphthalenediols, and the like. The organic portion of the alkaline earth metal alcoholates also can be derived from organic compounds containing both alcoholic hydroxyl and phenolic hydroxy groups.

Enhanced catalytic activity is imparted to the alkaline earth metal alcoholate upon moderate exposure to carbon dioxide and water. Such exposure results in a weight increase of the alkaline earth metal alcoholate and consequently, this weight increase provides a convenient measure of the optimum exposure of said alcoholate to water and carbon dioxide. In general, it is desirable to expose the alkaline earth metal alcoholates, for example, to moist carbon dioxide until a gain of at least about 5.0 weight percent, based on the weight of said metal alcoholate prior to the exposure treatment, is observed. However, excessive exposure of the alkaline earth metal alcoholates to carbon dioxide and water can result in a decrease of the catalytic activity of said metal alcoholates. The desirable upper limit regarding weight percent gain in the metal alcoholate upon exposure to carbon dioxide and water will depend, in the main, on the particular alkaline earth metal alcoholate contemplated. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Other factors which can affect this upper limit regarding weight gain on exposure to carbon dioxide and water are, for example, the method by which the metal alcoholate was prepared, the surface area of the metal alcoholate, and other considerations.

A third class of compounds useful as catalysts in the instant polymerization are the organic nitrile modified-alkaline earth metal amide-alcoholates. These catalysts are prepared by the mutual reaction and/or interaction of an alkaline earth metal hexammoniate, an olefin oxide, and an organic nitrile. The reaction is carried out in a liquid ammonia medium. In principle, the reaction temperature can range from above about the freezing point of ammonia, i.e., about —78° C., to the critical temperature of ammonia, i.e., about +133° C. The preservation of a liquid ammonia phase obviously requires pressurized equipment at reaction temperatures above the atmospheric boiling point of ammonia, i.e., about —33° C. A reaction temperature in the range of from above about the freezing point of the liquid ammonia medium to about 25° C. is preferred. In a more preferred aspect the upper temperature is about 10° C.

The ratio of the three components, i.e., alkaline earth metal hexammoniate, olefin oxide, and organic nitrile, can be varied over a wide range in the preparation of the novel catalysts. This reaction is conducted, as indicated previously, in an excess liquid ammonia medium. Thus, active catalysts can be prepared by employing from about 0.3 to 1.0 mol of olefin oxide per mol of metal hexammoniate, and from about 0.2 to 0.8 mol of organic nitrile per mol of metal hexammoniate. Extremely active catalyst can be prepared by employing from about 0.4 to 1.0 mol of olefin oxide per mol of metal hexammoniate, and from about 0.3 to 0.6 mol of organic nitrile per mol of metal hexammoniate. It should be noted that the alkaline earth metal hexammoniate, $M(NH_3)_6$ wherein M can be calcium, barium, or strontium, contains alkaline earth metal in the zero valence state. Thus, the concentration or mol ratio of the olefin oxide and the organic nitrile is more conveniently based upon alkaline earth metal per se rather than alkaline earth metal hexammoniate.

The olefin oxides contemplated as reagents in the preparation of the organic nitrile modified-alkaline earth metal amide-alcoholate catalysts are those containing solely carbon, hydrogen, and oxirane oxygen which is bonded to vicinal or adjacent carbon atoms to form an epoxy group, i.e.,

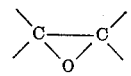

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4 - trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl - 6 - oxabicyclo[3.1.0]hexane, 4-ethyl-6-oxabicyclo[3.1.0]hexane, and the like.

The organic nitriles which are employed in the catalyst preparation are, preferably, the saturated aliphatic nitriles. Among the organic nitriles which are contemplated include, for example, acetonitrile, propionitrile, butyronitrile, valeronitrile, isovaleronitrile, capronitrile, caprylonitrile, caprinitrile, and the like. Lower saturated aliphatic nitriles are preferred, that is, acetonitrile, propionitrile, butyronitrile, and the like. Acetonitrile is most preferred.

In the preparation of the organic nitrile modified-alkaline earth metal amide-alcoholate catalysts, it appears that the olefin oxide reagent becomes bonded to the alkaline earth metal through the oxygen atom, i.e., R—O—M— wherein R would be ethyl when the olefin oxide is ethylene oxide, and M is the alkaline earth metal. However, analyses indicate that very little, if any, of the organic nitrile reagent is contained in the final product. It is believed that the nitrile moieties in the product are ammonolyzed by the excess ammonia present in the system and the nitrile reduction product (or products) is lost in the evaporation step of the excess ammonia. Thus, the organic nitrile appears to serve the unexpected function of promoting the catalyst product, that is, a product analytically similar to that obtained by the reaction of olefin oxide alone with alkaline earth metal hexammoniate, but in an extremely activated form.

The preparation of the organic nitrile modified-alkaline earth metal amide-alcoholate catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately; however, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl, diethyl, or dipropyl ethers of diethylene glycol; dioxane; saturated and cycloaliphatic hydrocarbons, e.g., hexane, heptane, cyclohexane, or 2-methylcycloheptane; and the like.

The preceding described catalysts are employed in catalytically significant quantities, and, in general, in catalyst concentration in the range of from about 0.01 to about 10 weight percent, and higher, based on the total weight percent, and higher, based on the total weight of monomeric material, is suitable. A catalyst concentration of from about 0.1 to about 3.0 weight percent is preferred. For optimum results, the particular catalyst employed, its preparation, its surface area, the nature of the monomeric reagent(s), the operative temperature at which the polymerization reaction is conducted, and other factors will largely determine the desired catalyst concentration.

The polymerization reaction can be conducted over a wide temperature range. Preferably, the polymerization reaction is conducted at a temperature in the range of from about 20°, and lower, to about 150° C., and higher, and more preferably from about 50° C. to about 120° C. As a practical matter, the choice of the particular temperature at which to effect the polymerization reaction depends, to an extent, on the nature of the monomer reagent(s) and particular catalyst employed, the concentration of the catalyst, and the like.

In general, the reaction time will vary depending on the operative temperature, the nature of the monomeric oxide reagent(s) employed, the particular catalyst and the concentration employed, the use of an inert organic diluent, and other factors. The reaction time can be as short as a few hours in duration or it can be as long as several days.

The polymers of this invention can be prepared via the bulk polymerization, suspension polymerization, or the solution polymerization routes. The polymerization reaction can be carried out in the presence of an inert organic diluent such as, for example, aromatic solvents, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as pentane, hexane, heptane, various normally-liquid petroleum hydrocarbon fractions, cyclohexane, the alkylcyclohexanes, decahydronaphthalene, and the like.

When polymerizing an admixture which contains an N-(2,3-epoxypropyl)carbazole and a vicinal-epoxy hydrocarbon, the concentration of said N-(2,3-epoxypropyl)carbazole can be varied over an extremely wide range. Preferably the concentration of either the N-(2,3-epoxypropyl)carbazole monomer or the vicinal-epoxy hydrocarbon monomer is in the range of from about 5 to about 95 weight percent, based on the total weight of said monomers. In a preferred aspect the novel copolymer products comprise from about 5 to 95 weight percent of N-(2,3-epoxypropyl)carbazole in copolymerized form with from about 95 to 5 weight percent of vicinal-epoxy hydrocarbon, based on the total weight of chemically combined monomers. In a further preferred aspect the novel copolymer products comprise from about 50 to 95 weight percent of vicinal-epoxy hydrocarbon in copolymerized form with from about 50 to 5 weight percent of N-(2,3-epoxypropyl)carbazole. Copolymers comprising a lower olefin oxide in copolymerized form with an N-(2,3-epoxypropyl)carbazole are highly preferred. Those copolymers comprising ethylene oxide in copolymerised form with an N-(2,3-epoxypropyl)carbazole are most preferred.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product. Recovery of the precipitated polymer can be effected by filtration, decantation, etc., followed by drying same as indicated previously.

The novel homopolymers and copolymers of this invention are a useful class of polymeric compounds. The copolymers can range from viscous liquids to hard, solid materials. The novel polymers can be used as solvents, lubricants, sizes, additives, vehicles and intermediates in the rubber, cosmetic, agriculture, textile, paint, and other industries. The water-insoluble solid copolymers, e.g., a copolymer containing 85 weight percent of propylene oxide in copolymerized form with 15 weight percent of N-(2,3-epoxypropyl)carbazole, etc., are useful for the production of various shaped articles such as, brush handles, buttons, lamp bases, and the like. The water-soluble and water-insoluble solid copolymers can be used as viscosity thickeners in aqueous and organic media, respectivly, thus having utility in paint formulations and paint removal formulations. The water-soluble and water-insoluble solid copolymers are also useful in the preparation of films by conventional techniques such as by milling on a two roll mill, calendering, solvent casting, and the like. In addition, as pointed out previously, the instant invention is admirably suited for the preparation of "tailor made" copolymers whose water-solubility or water-insolubility characteristic plays a dominant role in the ultimate end use of the copolymer. For example, should a water-soluble, solid copolymer be desired for a particular field of application, e.g., in the preparation of films from aqueous solution, in the preparation of coatings, and the like, the monomeric charge to a particular polymerization system can be adjusted so that a copolymer comprising a major proportion of ethylene oxide and a minor proportion of an N-(2,3-epoxypropyl)carbazole is prepared. This water-solubility characteristic of the copolymer becomes more pronounced when one prepares copolymers containing proportionately greater amounts of ethylene oxide. Conversely, copolymers comprising a minor proportion of ethylene oxide and a major proportion of an N-(2,3-epoxypropyl)carbazole are substantially water-insoluble. It is readily apparent from the preceding discussion that the novel polymers of this invention have a variety of uses.

In some of the illustrative examples to follow, the polymeric product is described as possessing a certain reduced viscosity value. By this term, i.e., "reduced viscosity" is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value is determined at a concentration of 0.2 gram of polymer per 100 milliliters of solvent, i.e., benzene or acetonitrile, at 30° C.

The relative copolymerization rate of ethylene oxide or propylene oxide with 2,3-epoxypropyl groups has been determined to be about 1.5 and 1.0, respectively. The copolymers which were prepared in the following illustrative examples agree with this relative rate data.

In the following illustrative examples, the polymerization reactions were conducted under an inert atmosphere e.g., nitrogen.

EXAMPLE 1

Strontium metal (22 grams) was dissolved in 500 milliliters of liquid ammonia. To the resulting solution there was slowly added a soluiotn of 16 grams of ethylene glycol in 200 milliliters of liquid ammonia, under continuous stirring. Subsequently, the ammonia was allowed to weather off for a period of 16 to 18 hours until a dry, grayish-white product remained. The resulting product, strontium glycoxide, was pulverized to a finely-divided powdery state under a nitrogen atmosphere, and subsequently, this powdery product was divided into several portions. Each portion, except the control, was individually placed into a desiccator and moist carbon dioxide, generated by bubbling carbon dioxide through a water bubbler, was introduced into the desiccator (maintained at approximately 25° C.) for varying periods of time. These exposed strontium glycoxides were catalytically active. Other pertinent data are disclosed in Table I below.

Table I

| Sample Number | Catalyst [1] | Exposure Time, Hours | Weight Percent Gain [2] |
|---|---|---|---|
| 1 | strontium glycoxide | 0.00 | |
| 2 | do | 0.25 | 7.5 |
| 3 | do | 0.5 | 10.9 |
| 4 | do | 1.0 | 19.1 |
| 5 | do | 2.0 | 40.4 |
| 6 | do | 3.0 | 46.5 |
| 7 | do | 5.0 | 53.6 |
| 8 | do | 5.5 | 58.6 |

[1] Exposed to moist carbon dioxide as indicated.
[2] Based on the weight of strontium glycoxide prior to exposure to moist carbon dioxide.

EXAMPLE 2

Calcium metal (20 grams) was dissolved in 1,500 milliliters of liquid ammonia. To the resulting solution there was slowly added a solution of 29.4 grams of ethylene glycol in 400 milliliters of liquid ammonia under continuous stiring. Subsequently, the ammonia was allowed to weather off for a period of 16 to 18 hours until a dry, grayish-white product remained. The resulting product, calcium glycoxide, was pulverized to a finely-divided powdery state under a nitrogen atmosphere, and subsequently, this powdery product was divided into several portions. Each portion, except the control, was individually placed into a desiccator and moist carbon dioxide, generated by bubbling carbon dioxide through a water bubbler, was introduced into the desiccator (maintained at approximately 25° C.) for varying periods of time. These exposed calcium glycoxides were catalytically active. Other pertinent data are disclosed in Table II below.

Table II

| Sample Number | Catalyst [1] | Exposure Time, Hours | Weight Percent Gain [2] |
|---|---|---|---|
| 1 | calcium glycoxide | 0.00 | |
| 2 | do | 0.08 | 6.3 |
| 3 | do | 0.17 | 13.6 |
| 4 | do | 0.5 | 22.6 |
| 5 | do | 1.0 | 26.0 |
| 6 | do | 3.0 | 57.8 |

[1] Exposed to moist carbon dioxide as indicated.
[2] Based on the weight of calcium glycoxide prior to exposure to moist carbon dioxide.

EXAMPLE 3

Calcium metal (10 grams) is dissolved in 350 milliliters of liquid ammonia. To the resulting solution there is slowly added a solution 15.5 grams of ethylene glycol in 350 milliliters of liquid ammonia under continuous stirring. Subsequently, the ammonia is allowed to weather off for a period of 16 to 18 hours. The resulting grayish-white product then is pulverized, under a nitrogen atmosphere, to a finely-divided powdery state. This powdery product is spread on a Petri dish which is then inserted into a desiccator. Moist carbon dioxide, generated by bubbling carbon dioxide through a water bubbler, is then introduced into the desiccator via a gas inlet conduit, said desiccator being maintained at about 25° C. The powdery product is exposed to this treatment for about 3 to 4 hours until there is a weight increase of between about 46 to 56 percent in said powdery product. Subsequently, said exposed product is placed under vacuum (3 to 5 mm. of Hg) at a temperature of about 57° C. for a period of about 2 to 3 hours until there is a weight loss of about 18 to 26 percent. The activated calcium glycoxide thus produced is catalytically active.

EXAMPLE 4

Liquid ammonia (2 liters) was added to a 3-liter glass resin flask (maintained in a Dry Ice-acetone bath, the temperature of which was below the boiling point of liquid ammonia) while avoiding exposure to the atmosphere. Ethylene oxide (10 grams) was then dissolved in the stirred liquid ammonia. Subsequently, calcium metal nodules (100 grams) was added to the ethylene oxide-ammonia solution over a 15-minute period while stirring was continued. The flask was allowed to stand overnight exposed to room temperature conditions (approximately 20°–22° C.) while the ammonia weathered off. The solid product was transferred at room temperature, in a nitrogen filled "dry box," to a one-ballon stainless steel container half filled with glass marbles. Two liters of heptane were added to said container which was then abitated in a reciprocatinb paint shaker for one hour thus producinb a slurry or suspension in heptane. This slurry containing calcium amide-ethylate was catalytically active.

EXAMPLE 5

Liquid ammonia (2 liters) was added to a resin flask (maintained in a Dry Ice-acetone bath, the temperature of which was about −70° C.). Calcium metal nodules (40 grams) was then dissolved in the stirred liquid ammonia. To the resulting solution there were slowly added 21 grams of acetonitrile and 58 grams of propylene oxide. The external Dry Ice-acetone bath then was removed, and the flask exposed to rom temperature conditions, i.e., approximately 22° C., for 16 hours. After this period of time the liquid ammonia phase had disappeared (weathered or evaporated from the system) and a gray-white solid remained. This solid product was placed in a stainless steel container, and said product was covered with heptane. Subsequently, this admixture was agitated in a reciprocating paint shaker for one hour thus producing a catalyst slurry or suspension in heptane. Throughout the operation extreme care was taken to exclude the presence of oxygen, water and carbon dioxide from the reaction system. The resulting suspension was catalytically active.

EXAMPLE 6

To a two-liter stainless steel autoclave containing 381 grams of toluene and 0.6 gram of exposure activated calcium glycoxide (prepared in the manner set forth in Example 3 supra; overall weight gain of about 26 percent), there were charged 153 grams of ethylene oxide, 29 grams of N-(2,3-epoxypropyl)-carbazole, and 10 grams of butane. The resulting admixture was heated to a temperature of about 108° C. and maintained thereat for a period of 48.5 hours. Subsequently, the reaction product mixture was cooled to about 25° C., and about 1,000 milliliters of hexane was added thereto thus precipitating the copolymeric product. This product was recovered by decantation and dried under reduced pressure at 30° C. There were obtained 109 grams of a hard, solid copolymer which had a reduced viscosity of 0.56 in acetonitrile. Nitrogen analysis of said product was 8.9 percent. This copolymeric product was soluble in water; no water-insoluble fraction was observed.

EXAMPLE 7

To a Pyrex tube, there were charged 3 grams of an admixture which contained 95 weight percent of ethylene oxide and 5 weight percent of N-(2,3-epoxypropyl)carbazole, and 1.3 milliliters of calcium amide-ethylate slurry in heptane similarly prepared as described in Example 4 supra (contained 0.2 gram of calcium calculated as the metal). The tube was sealed and polymerization was immediately evident. Afterwards, the tube was broken open, and the reaction product mixture was washed with about 100 milliliters of hexane, followed by drying the resulting copolymeric product under reduced pressure at 25° C. for approximately 16 hours. There was obtained 0.4 gram of a white, hard, solid copolymer which had a reduced viscosity of 1.98 in acetonitrile. This copolymeric product was soluble in water; no water-insoluble fraction was observed.

When an equivalent amount of 1,2-epoxybutane is substituted for ethylene oxide in the above reaction, a water-insoluble copolymeric product is obtained.

EXAMPLE 8

To a Pyrex tube, there were charged 3 grams of an admixture which contained 85 weight percent of propylene oxide and 15 weight percent of N-(2,3-epoxypropyl)carbazole, and 1.3 milliliters of a catalyst slurry in heptane similarly prepared as described in Example 11 supra (contained 0.2 gram of calcium calculated as the metal). The tube was sealed and rotated end over end for a period of 268 hours at 25° C. After this period of time the tube was broken open, and the reaction product mixture was washed with about 100 milliliters of hexane. After this, the resulting product was dried under reduced pressure at 25° C. for a period of about 16 hours. There were obtained 2 grams of a brown, tacky copolymer which had a reduced viscosity of 0.05 in benzene. Nitrogen analysis was 2.86 percent. This product was insoluble in water; no water-soluble fraction was observed.

Although the invention has been illustrated by the preceding examples, the invention is not to be construed as limited to the materials employed in the above-said exemplary examples, but rather, the invention encompasses the generic area as hereinbefore disclosed. Various modifications and embodiments of this invention can be made without departing from the spirit and scope thereof.

What is claimed is:

1. A copolymer containing a vicinal-epoxy hydrocarbon which has a single vicinal epoxy group and which is free from unsaturation other than benzenoid unsaturation, in copolymerized form with an N-(2,3-epoxypropyl) carbazole having the formula:

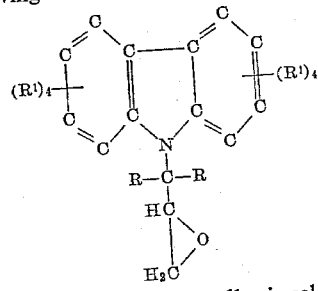

wherein each R and $R^1$, individually, is selected from the group consisting of hydrogen and alkyl.

2. The copolymer of claim 1 wherein said vicinal-epoxy hydrocarbon contains from 2 to 4 carbon atoms.

3. The copolymer of claim 2 wherein said vicinal-epoxy hydrocarbon is ethylene oxide.

4. A copolymer containing ethylene oxide in copolymerized form with N-(2,3-epoxypropyl)carbazole.

References Cited in the file of this patent

UNITED STATES PATENTS

| | | |
|---|---|---|
| 2,498,195 | Ballard et al. | Feb. 21, 1950 |
| 2,897,178 | Hill | July 28, 1959 |

FOREIGN PATENTS

| | | |
|---|---|---|
| 220,517 | Australia | Feb. 19, 1959 |
| 477,843 | Great Britain | Jan. 3, 1938 |

OTHER REFERENCES

Ezrielev et al.: Zhur. Obshchei Khim., 26, 791–3 (1956).

Ezrielev et al.: J. Gen. Chem. (U.S.S.R.) 26, 905–6 (1956).